(12) United States Patent
Ferguson

(10) Patent No.: US 6,552,452 B2
(45) Date of Patent: Apr. 22, 2003

(54) DYNAMOELECTRIC MACHINE ROTOR VENTILATION

(75) Inventor: James Harold Ferguson, Peterborough (CA)

(73) Assignee: General Electric Canada Inc., Mississauga (CA)

( * ) Notice: Subject to any disclaimer, the term of this patent is extended or adjusted under 35 U.S.C. 154(b) by 15 days.

(21) Appl. No.: 09/982,231

(22) Filed: Oct. 19, 2001

(65) Prior Publication Data
US 2002/0050748 A1 May 2, 2002

(30) Foreign Application Priority Data
Oct. 26, 2000 (CA) .............................. 2324696

(51) Int. Cl.[7] .............................. H02K 9/02; H02K 9/04
(52) U.S. Cl. .............................. 310/61; 310/52; 310/58; 310/59
(58) Field of Search .............................. 310/52, 58, 59, 310/61, 62

(56) References Cited

U.S. PATENT DOCUMENTS

| | | | |
|---|---|---|---|
| 3,969,643 A | * | 7/1976 | Sapper ........................ 310/53 |
| 4,020,373 A | | 4/1977 | Yamamoto et al. |
| 4,182,966 A | | 1/1980 | Mishra et al. |
| 4,233,533 A | | 11/1980 | Lown |
| 4,383,191 A | | 5/1983 | Mizuyama et al. |
| 4,859,887 A | | 8/1989 | Carlsson et al. |
| 5,065,058 A | | 11/1991 | Ferguson et al. |
| 5,214,325 A | * | 5/1993 | Matson et al. ................. 310/58 |
| 5,757,094 A | | 5/1998 | Van Duyn |
| 5,898,246 A | | 4/1999 | Hoffman ................... 310/60 R |
| 5,939,805 A | * | 8/1999 | Vanduyn ...................... 310/58 |

FOREIGN PATENT DOCUMENTS

| | | | |
|---|---|---|---|
| CA | 1238933 | 7/1988 | |
| DE | 2401588 | 4/1999 | ............ H02K/9/04 |
| JP | 54060404 | 5/1979 | ............ H02K/9/02 |

* cited by examiner

Primary Examiner—Burton S. Mullins

(57) ABSTRACT

A dynamoelectric machine has a stator member, a rotor member, a first shroud and a second shroud. The first shroud and the second shroud members are mounted to the rotor adjacent respective first and second end portions of the rotor for rotation with the rotor. The first and second shrouds extend radially over and are spaced from the respective radially extending first and second end portions of the rotor to respectively define radial inlet and outlet paths therewith. The first and second shrouds each have a first radially inner end adjacent and spaced from the shaft to define a gas inlet or outlet, respectively, and a second radial outer end mounted to the rotor adjacent and spaced apart the ventilation ducts for communicating gas between the ventilation ducts and the inlet and outlet paths. The second outlet shroud is spaced further from the shaft than the inlet shroud so as to facilitate the gas flowing in the inlet shroud and out the outlet shroud during normal machine operation. Fan motors are provided at the inlet and outlet of the shrouds to direct gas flow. The present invention provides for an improvement in windage loss by angularly accelerating the gas prior to entering the ventilation ducts of the rotor and an additional improvement by partially reclaiming energy at the outlet shroud energy by angularly decelerating the gas flow.

6 Claims, 2 Drawing Sheets

DYNAMOELECTRIC MACHINE ROTOR VENTILATION

FIELD OF THE INVENTION

The present invention relates to dynamoelectric machines having a rotor that is cooled using forced convection of gases to remove heat from the rotor. It is particularly applicable to high speed machines where the windage loss experienced by the machines is significant.

BACKGROUND OF THE INVENTION

This invention is an improvement on my Canadian Patent 1,238,933 issued Jul. 5, 1988 and entitled Cooling System with Reduced Windage Loss. My Canadian Patent discloses a sealed rotor dynamoelectric machine having reduced windage loss by having turning vanes at opposite ends of the rotor. One set of vanes is utilized for directing gas into the rotor and another set of vanes for directing the gas from the rotor into adjacent rotary structure for circulation. The rotor has cooling slots defined by the interpolar space between two adjacent poles of the rotor and a shield or cover member placed across the slot to enclose the interpolar space. Any gas directed by the vanes into the slot moves axially along the slot and is prevented by the shield cover from moving radially out the slot, across the air gap and into the stator member surrounding the rotor. As a result, the use of the vanes and the cover shield provide a reduction in windage loss associated with gas flow for cooling the rotor structure Accordingly there is a need to provide a ventilation system for a dynamoelectric machine wherein windage loss associated with coolant gases entering the rotor interpolar spaces or ducts present a minimal windage loss while at the same time having the advantage associated with the use of interpolar space coolant ducts.

SUMMARY OF THE INVENTION

The present invention relates to the cooling of a dynamoelectric machine having a rotor with a shield or cover as disclosed in my previous Canadian Patent 1,238,933 and with the improvement of inlet and outlet shrouds extending radially over opposite radial end surfaces of the rotor. The inlet shroud provides a gas inlet path where rotation of the shroud acts as a pump to accelerate the gas tangentially to have an angular velocity equivalent to that of the rotor at the rotor poles. The inlet shroud then directs the gas into the axially extending interpolar spaces. The outlet shroud covers the other side or end surfaces of the rotor to provide a radially extending outlet path from the rotor poles towards the rotor axis. The outlet shroud acts as a turbine to recover energy from the gas stream as the angular component of velocity of the gas decelerates. As a result, windage loss associated with gas stream flow into and out of the interpolar spaces or ducts is reduced.

Preferably, a blower or pump motor is utilized to direct the gas flow through the rotor in a predetermined direction and to compensate for static pressure losses of the gas moving axially along the interpolar spaces. However, the radial extension of the inlet shroud relative to the outlet shroud may be chosen to optimize windage loss and compensate for static pressure losses. It is envisaged that in some embodiments no external pump or blower is needed to compensate for static pressure losses.

In accordance with one aspect of the present invention there is provided a dynamoelectric machine comprising a stator member and a rotor member mounted within the stator member on an axially extending shaft. The rotor member having spaced apart radially extending first and second end portions and a plurality of spaced apart ventilation ducts each extending between the first and second end portions in a substantially axial direction. The machine comprises a first shroud member mounted to the rotor adjacent the first end portion of the rotor for rotation therewith. The first shroud extends radially over and is spaced from the radially extending first end portion of rotor to define a radial gas inlet path therewith. The first shroud has a first radially inner end portion adjacent to and spaced from the shaft to define a gas inlet and a second radial outer end portion mounted to the rotor for directing gas into the ventilation ducts. The first shroud member rotates with the rotor to angularly accelerate the moving gas along the radial gas inlet path and into the ventilation ducts. The machine includes a second shroud member mounted to the rotor adjacent the second end portion of the rotor for rotation therewith. The second shroud extends radially over and is spaced from the radially extending second end portion of rotor to define a radial gas outlet path therewith. The second shroud has a second radially inner end portion adjacent to and spaced from the shaft to define a gas outlet and a second radial outer end portion mounted to the rotor adjacent the spaced apart ventilation ducts for receiving gas exiting the ventilation ducts. The second shroud member rotates with the rotor to decelerate angularly the gas exiting the ventilation ducts and traveling along the radial gas outlet path.

Preferably, the rotor includes a plurality of spaced apart poles adjacent an air gap with the stator member. Between adjacent poles is defined an axially extending interpolar space and a cover member extends between the poles across the interpolar spaces to define the ventilation ducts. Alternatively, the ventilation ducts may be axial passages in the rotor core.

Preferably the dynamoelectric machine is a sealed rotor dynamoelectric machine. Preferably each of the first and second shrouds has a curved rim surface adjacent respective first and second radially outer ends to redirect gas flow respectively between radial and axial flow, and axial and radial flow. It should be understood that the curved rim may comprise a single metal member bent into a curve or a series of flat pieces angled relative to each other to provide the required curvature.

It is within the realm of the present invention for the dynamoelectric machine to include a blower motor adjacent one of the gas inlet, gas outlet or both to direct gas flow into the gas inlet, along the radial gas inlet path, axially along the ventilation ducts, along the radial gas outlet path and out the gas outlet.

It is also envisaged that the outlet shroud extends radially towards the axis a predetermined distance less than the inlet shroud to create a pressure differential between the gas inlet and gas outlet that causes or facilitate the flow of gas into the inlet, across the rotor and out the outlet.

BRIEF DESCRIPTION OF THE DRAWING

For a better understanding of the nature and objects of the present invention reference may be had to the accompanying diagrammatic drawings in which.

DESCRIPTION OF THE PREFERRED EMBODIMENTS

Figure 1:
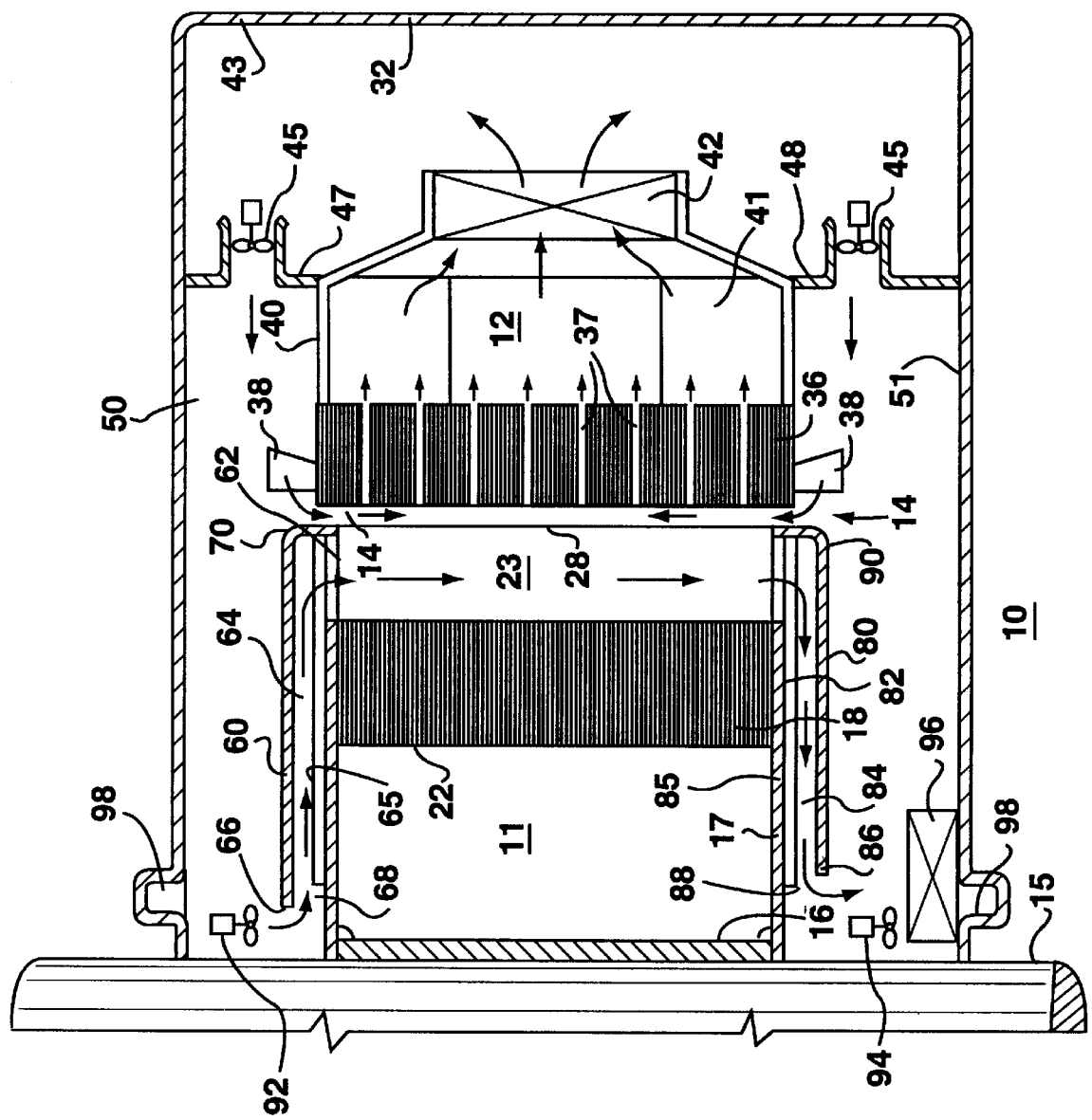
FIG. 1 is a radial cross-section of a dynamoelectric machine according to the present invention; and, FIG. 2 is a partial axial cross-section of the rotor and stator of the dynamoelectric machine of the present invention.
Figure 2:
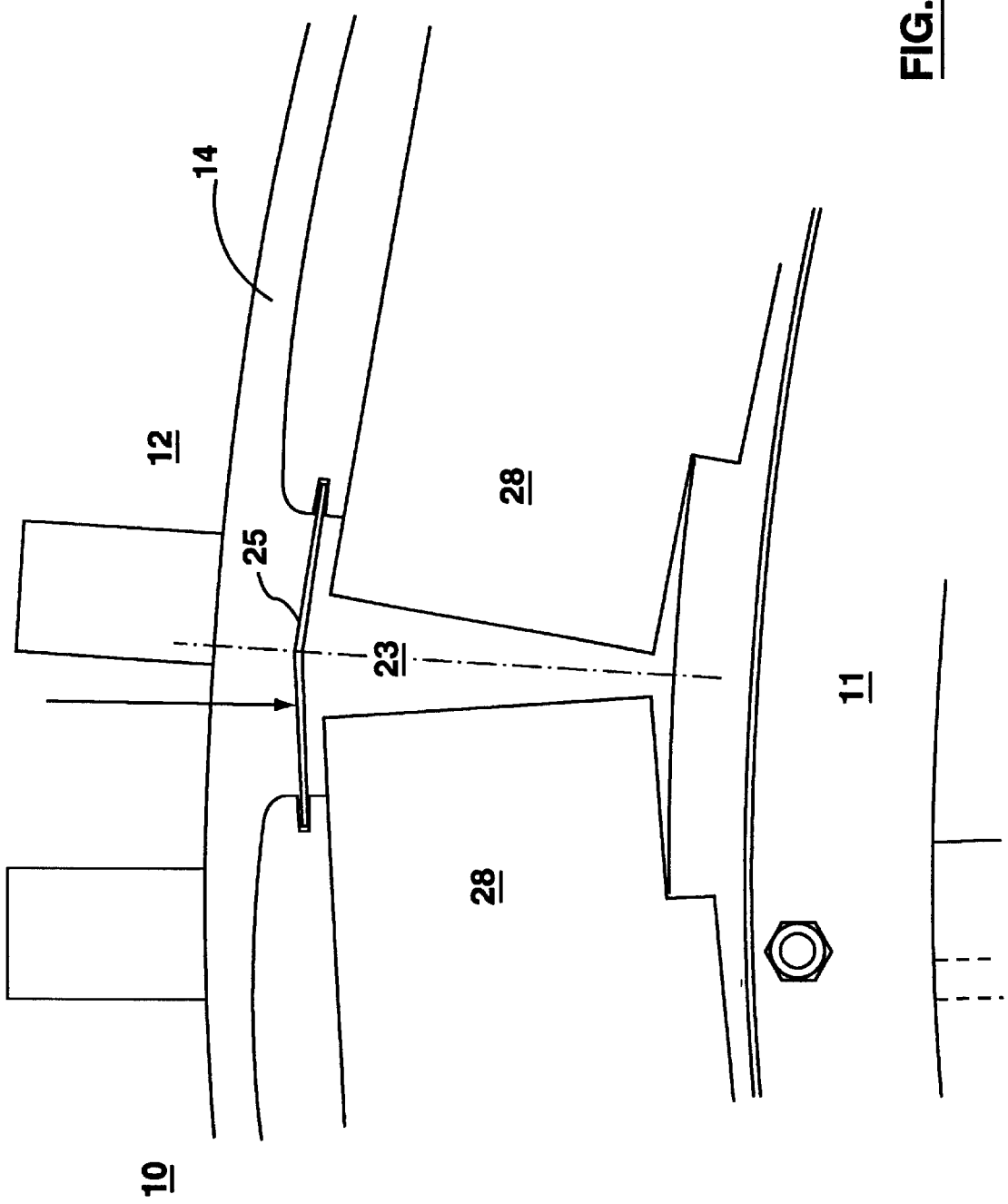

Referring to FIG. 1 there is shown a cross-sectional view of a portion of a vertically mounted dynamoelectric machine 10 having a rotor 11 and a stator 12. While the dynamoelectric machine 10 is shown with a vertical shaft 15, such as is normally used in a hydro generator, the present invention may also be used with horizontal shaft machines. Between the rotor 11 and the stator 12 is an air gap 14 which separates these two structures. The rotor 11 is attached to a rotatable shaft 15 which is mounted in a bearing structure (not shown) to permit rotation of the shaft 15 with rotor 11. A hub member 16 is keyed or otherwise suitably secured to shaft 15. Radially extending support plate 17 extends from the hub member 16 to rotor core structure 18. Laminations 22 which comprise the rotor core carry poles 28 which have axially extending ventilating ducts or cooling ducts 23. Adjacent poles 28, are shown in FIG. 2 with the ventilation duct 23 extending along the interpolar space between the poles 28. In FIG. 2, a shield 25 covers the interpolar space 23 and thereby prevents gas flow from extending radial outward of the ventilation duct 23 and directs the gas flow axially through the ventilation ducts 23 as shown in FIG. 1.

The rotor 11 is mounted for rotation circumferencially within the stator 12. The stator 12 is shown to have regularly extending ventilation passages 37. Conductors extend through the stator core 36 and the end turns 38 of the conductors are schematically represented. A housing 40 extends from the stator 12 forming a chamber 41. A cooler 42 is mounted to the housing 40 so the coolant gas or gas which is passed through the passages 37 will pick up heat generated from the stator core 36, pass into chamber 41, and have heat removed as gas passes through the cooler 42. A wall 43 extends around the stator defining chamber 44. Motor driven fans 45 and 46 are mounded in openings in respective walls 47 and 48 to move the coolant gas from the chamber 44 into the chambers 50 and 51 where the coolant gas passes over the entrance 38 and into the air gap 14.

It will be seen that there is a circulation of a coolant gas or gas to cool the stator 12 and another to cool the rotor 11. The rotor 11 is provided with a first shroud member 60 mounted to the rotor 11 adjacent a first axial end of the rotor 62 for rotation therewith. The first shroud 60 extends radially over and is spaced from the radially extending first end 62 of the rotor to define a radial gas inlet path 64. The first shroud 60 has a first radial inner end 66 adjacent to and spaced from the shaft 15 to define a gas inlet 68. The first shroud 62 further has a second radial outer end 70 mounted to the rotor 11 adjacent to and spaced apart from the ventilation ducts 23 so as to communicate the gas from the radial gas inlet path 64 into and through the ventilation ducts 23 of the rotor 11. A plurality of radially extending blades 65 are mounted to the rotor support plate 17 across from the shroud end 70. Blade 65 assists in the angular acceleration of the gas flow.

In accordance with the present invention there is further provided a second shroud member 80 mounted to the rotor 11 adjacent the second axial end 82 of the rotor 11. Shroud 80 also rotates with the rotor 11. The second shroud 80 extends radially over and is spaced from the radial second end 82 of the rotor 11 to define a radial gas outlet path 84. The second shroud 80 has a second radially inner end 86 adjacent to and spaced from the shaft 15 to define a gas outlet 88. The second shroud 80 further has a second radial outer end 90 mounted to the rotor 11 adjacent and spaced apart from the ventilation ducts 23 for communicating gas from the ventilation ducts 23 into and though the radial gas outlet 84 and out the gas outlet. In the embodiment shown the radial extension of the second shroud 80 is less then the radial extension of the first shroud 60 such that the predetermined distance of the second outlet shroud is less then the first inlet shroud. This has the effect of facilitating gas flow through the rotor in the direction of the arrow shown. A plurality of radially extending blades 85 are mounted to the rotor support plate 17 across from the outlet shroud 80 and are connected at one end to the outlet shroud end 90. The blades 85 assist in reclaiming energy from the gas flow.

To further facilitate the gas flow in the direction shown by the arrows through the rotor 11, the inlet 68 of the first shroud 60 is provided with motor driven fan 92 and the gas outlet 88 of the second shroud 80 is provided with motor driven fan 94. The direction of these fans forces gas movement in the same direction as the arrows shown or through the rotor ventilation duct 23.

Gas flow exiting the outlet 88 of the second shroud 80 passes through cooler 96, into passage 98 and back to the inlet 68 of the first shroud 60.

The dynamoelectric machine 10 shown in the drawings is a sealed rotor dynamoelectric type machine. That is a wall 32 extends completely around the stator and rotor of the dynamoelectric machine.

The first and second shroud 60 and 80 have a curved rim respectively adjacent corners 70 and 90 so as to redirect gas flow respectively between a radial flow and an axially flow as shown in the drawings.

The shrouds 60 and 80 so joined to the rotor provide gas passages 64 and 84 in gas flow communication with the ventilation ducts 23 provide a gas circulation system that utilizes the pumping action associated with both the first and second shrouds 60 and 80 to move or force gas through the ventilation ducts 23 of the rotor to cool the rotor by forced convection. Further, the energy imparted into the gas by the rotor to angularly accelerate the gas up to speed in the inlet passage 64 is partially reclaimed, by the outlet passage 84 as the gas angularly decelerates and exits the second shroud 80. Hence, windage loss associated with this structure is reduced by the angular deceleration of the gases.

It should be understood that alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. A dynamoelectric machine comprising:

a stator member;

a rotor member mounted within the stator member on an axially extending shaft, the rotor member having spaced apart radially extending first and second end portions and a plurality of spaced apart ventilation ducts each extending between the first and second end portions in a substantially axial direction;

a first shroud member mounted to the rotor adjacent the first end portion of the rotor for rotation therewith, the first shroud extending radially over and spaced from the radially extending first end portion of rotor to define a radial gas inlet path therewith, the first shroud having a first radially inner end portion adjacent to and spaced from the shaft to define a gas inlet and a second radial outer end portion mounted to the rotor for directing gas into the ventilation ducts, and the first shroud member rotating with the rotor to angularly accelerate the moving gas along the radial gas inlet path and into the ventilation ducts; and, a second shroud member mounted to the rotor adjacent the second end portion of the rotor for rotation therewith, the second shroud extending radially over and spaced from the radially extending second end portion of rotor to define a radial gas outlet path therewith, the second shroud having a second radially inner end portion adjacent to and spaced from the shaft to define a gas outlet and a second radial outer end portion mounted to the rotor adjacent the spaced apart ventilation ducts for receiving gas exiting the ventilation ducts, and the second shroud member rotating with the rotor to decelerate angularly the gas exiting the ventilation ducts and traveling along the radial gas outlet path.

2. The dynamoelectric machine of claim 1 wherein the rotor includes a plurality of spaced apart poles adjacent an air gap with the stator member, adjacent ones of the poles having an axially extending interpolar space and a cover member extending between the poles across the interpolar spaces to define the ventilation ducts.

3. The dynamoelectric machine of claim 1 wherein the machine is a sealed rotor dynamoelectric machine.

4. The dynamoelectric machine of claim 1 wherein each of the first and second shrouds has a curved rim surface adjacent respective first and second radially outer end portions to redirect gas flow respectively between radial and axial flow, and axial and radial flow.

5. The dynamoelectric machine of claim 1 further including a blower motor adjacent one of the gas inlet, gas outlet and both to direct gas flow into the gas inlet, along the radial gas inlet path, axially along the ventilation ducts, along the radial gas outlet path and out the gas outlet.

6. The dynamoelectric machine of claim 1 wherein second outlet shroud extends radially towards the shaft a predetermined distance less than the first inlet shroud.

* * * * *